United States Patent [19]
Sato et al.

[11] 3,774,299
[45] Nov. 27, 1973

[54] METHOD FOR PRODUCTION OF PANEL HEATER

[75] Inventors: Masaki Sato; Hiromitsu Makita, Noriyuki Toyota, all of Tokyo, Japan

[73] Assignee: Kureha Kagaku Kabushiki Kaisha, Tokyo-to, Japan

[22] Filed: Sept. 20, 1971

[21] Appl. No.: 181,958

[30] Foreign Application Priority Data
Sept. 21, 1971 Japan.................. 45/81940

[52] U.S. Cl...................... 29/611, 156/47, 156/52, 219/528, 219/544, 219/549, 338/255, 338/257
[51] Int. Cl. ................................ H05b 3/00
[58] Field of Search................ 29/611, 610, 621; 264/131; 156/47, 51, 52; 117/232, 218; 338/255, 256, 277, 212, 254, 257; 219/528, 544, 549

[56] References Cited
UNITED STATES PATENTS
1,963,554 6/1934 McDill.................... 338/257 X
3,168,617 2/1965 Richter.................... 156/47 X
3,367,851 2/1968 Filreis et al................ 338/212 X
3,481,802 12/1969 Marcell.................... 156/52
3,523,844 8/1970 Crimmins et al............ 156/52
3,532,570 10/1970 Cotter.................... 156/52

*Primary Examiner*—Charles W. Lanham
*Assistant Examiner*—V. A. Dipalma
*Attorney*—E. F. Wenderoth et al.

[57] ABSTRACT

A method of producing a panel heater element by the steps of mixing carbon fiber with natural or synthetic fibers, forming the mixture into a base sheet, heat-treating the base sheet to expel volatile matter therefrom, fitting electrodes to the sheet, placing an insulative thermoplastic resin film against both surfaces of the base sheet and hot-rolling the base sheet, and finally cold-rolling the resin-coated sheet.

3 Claims, 7 Drawing Figures

Patented Nov. 27, 1973

MASAKI SATO,
HIROMITSU MAKITA and
NORIYUKI TOYOTA,

INVENTORS

BY Wenderoth, Lind & Ponack

ATTORNEYS

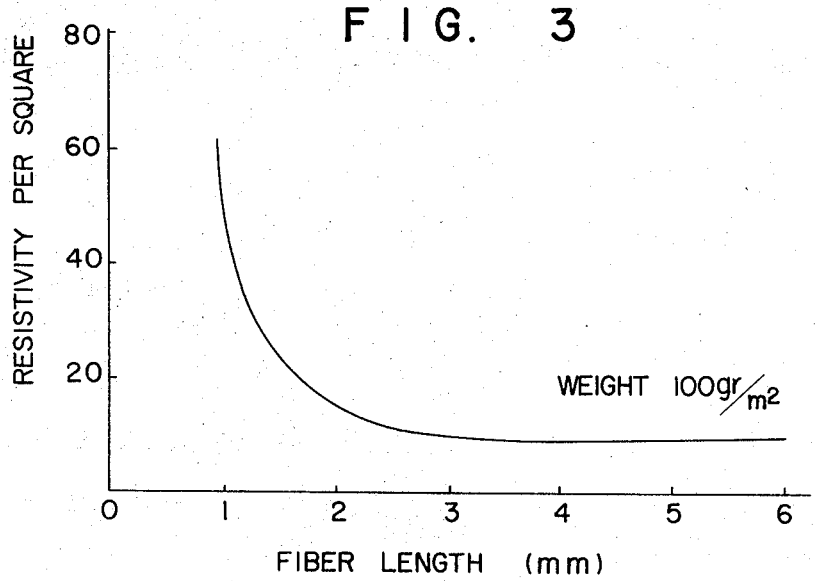
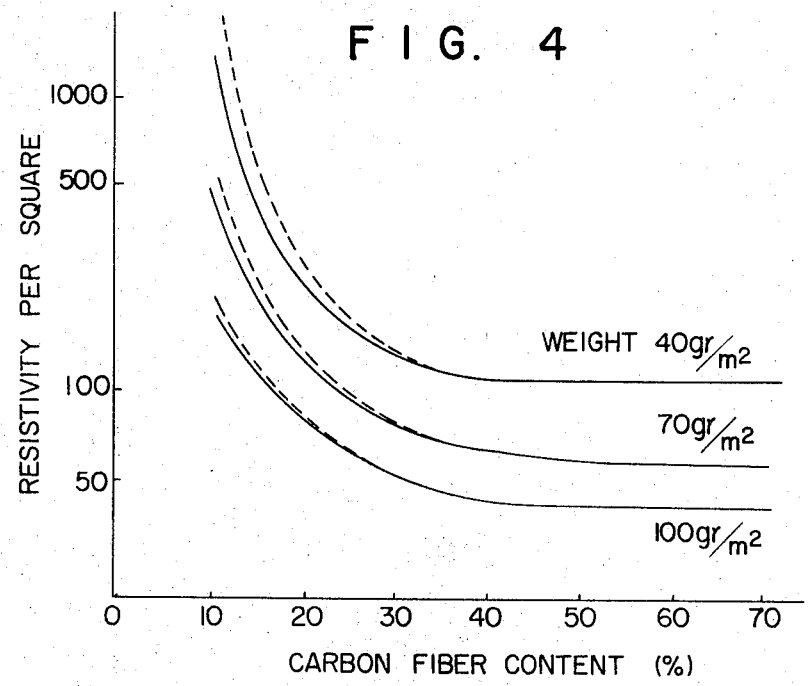

METHOD FOR PRODUCTION OF PANEL HEATER

This invention relates to a method for manufacturing a panel heater. More particularly, it is concerned with a method of making a panel heater of a particular construction, in which there are used an electro-conductive sheet as a heat generating element containing therein a quantity of carbon fiber, a metal wire net serving as electrodes, and a laminated synthetic resin film as a protective insulative coating heater in a most efficient and simple manner.

It has heretofore been known to manufacture a panel heater using various metals or carbon fiber as a heat generating element and to cover such heat generating element with a synthetic resin film as a protective insulative coating. Also, various improvements have been made in the configuration of the electrode or terminal for such panel heater. As an example of the heat generating element, there has been generally used an electro-conductive web as a resistance element, which is produced by mixing carbon fiber obtained from carbonization of cellulose fiber with pulp. In this case, the carbon fiber content (i.e. mixing ratio) should be within a range of from 1 to 35 percent by weight with a view to adjusting the resistance value of the heat generating element.

In such case, however, as the variation in resistance value of the heat generating element is considerable depending on the carbon fiber content, not only is it difficult to obtain an electroconductive web having a constant resistance value, but also the resistance value greatly varies due to bending, stretching, compressing, friction, and other external forces imparted at the time of manufacturing and handling of the heat generating element. For the abovementioned reasons, it has been difficult to produce with good reproducibility a heat generating body having uniform temperature distribution therethroughout as well as stabilized performance. Moreover, as the content of the carbon fiber is low, the contact resistance at the electrode portions becomes large with the result that the contact resistance becomes greatly increased even with slight damage caused to the carbon fiber at the time of fitting the electrodes, hence local heating tends to occur easily. Accordingly, it is difficult to manufacture the heat generating element having the desired performance.

The present invention seeks to solve such disadvantages inherent in the known type of panel heater, and to provide a method of making an improved panel heater of any selected resistance value, having uniform temperature distribution throughout the surface thereof, and having sufficient stability against any external mechanical force to be imparted thereto.

It is therefore an object of the present invention to provide an improved method of making a panel heater, in which an electro-conductive sheet of high carbon fiber content is used as a heat generating (or resistance) element.

It is another object of the present invention to provide an improved method of making a panel heater of a particular construction, in which an electro-conductive sheet obtained by mixing 35 to 75 percent by weight of carbon fiber with the remainder of cellulose fiber is used as a resistance element, and both surfaces of such resistance element are coated with a thermoplastic synthetic resin film as an insulative material.

It is still another object of the present invention to provide an improved method of manufacturing a panel heater of the abovementioned construction, which comprises drying the electro-conductive sheet from a paper-making machine, immediately placing onto both surfaces of the sheet a laminated insulative, thermoplastic synthetic resin film by means of a heated pressing roll, and solidifying and fixing the shape of the molten resin of the preceding process step by a cooled pressure roll.

The foregoing objects as well as details of the present invention will become more apparent from the following description when read in conjunction with the preferred embodiments as well as the accompanying drawing.

In the drawing:

FIG. 3 is a graphical representation showing relationship between carbon fiber length and electric resistance of a sheet composed of carbon fiber and cellulose fiber and to be used as a resistor for the panel heater according to the present invention;

FIG. 4 is another graphical representation showing relationship between carbon fiber content in the sheet resistor and electric resistance thereof;

Figure 1:
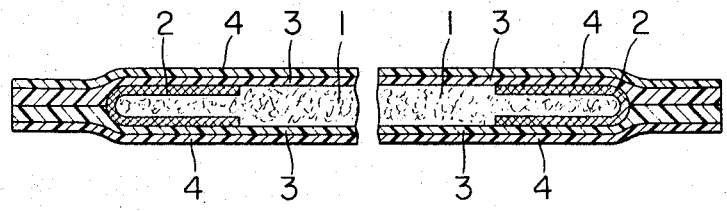
FIG. 1 is a schematic cross-section showing the structure of the panel heater according to the present invention.
Figure 2:
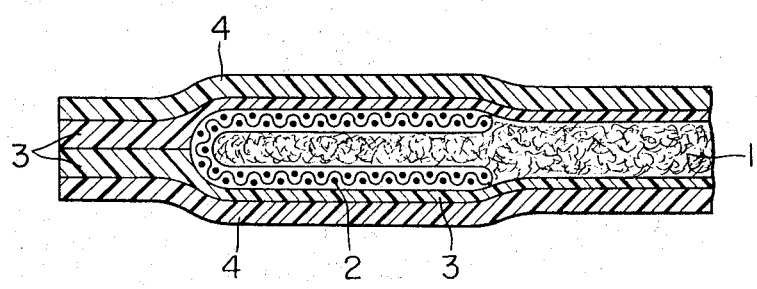
FIG. 2 is an enlarged cross-section of an electrode part of the panel heater shown in FIG. 1 for clear understanding of the characteristic of the present invention.

Referring now to FIGS. 1 and 2, the panel heater is constructed with an electroconductive sheet (or web) 1, electrodes 2 made of metal wire net, a laminated synthetic film composed a layer 3 of a resin of which is easily meltable and another layer 4 of a resin of which is difficult to melt.

The laminated film is placed on both surfaces of the electroconductive sheet with the layer 3 of easily meltable resin as an inner layer in directly contact with the base sheet. By a heat-pressing or heat-rolling operation, only the layer 3 of the easily meltable resin becomes soft or molten, while the layer 4 of the resin which is difficult to melt is heated under pressure at such a temperature that is does not soften the resin, whereby the molten resin of the layer 3 penetrates partially into the electroconductive sheet 1 and the metal wire net electrode 2 to bond them together, and the electrode 2 is buried in the electro-conductive sheet 1 in good contact with the carbon fiber in the sheet. On the other hand, the resin 4 which is difficult to melt remains as a stable and strong outermost layer without becoming molten during heat-treatment under pressure.

It goes without saying that the adhesive of an easily meltable resin film to a base sheet has heretofore been done by a heat-rolling method. However, in the heretofore practiced method, when the conditions for the press-bonding are stringent, the melting and penetration of the resin film becomes excessive with the consequence that parts of the metal wire net or even the base sheet itself tend to be exposed, which is liable to cause reduction of the insulation and durability of the product. On the other hand, if the conditions for the press-bonding are not stringent the bonding between the resin and the base sheet as well as the electrode becomes insufficient, which makes it difficult to regulate the optimum condition for the press-bonding, whereby productivity is lowered.

The electro-conductive sheet (or web) to be used in the present invention can be those which are prepared by mixing carbon fibers with natural or synthetic organic fibers such as cellulosic fibers, polyvinyl alcohol fibers, polyamide fibers, acrylic fibers, etc., or inorganic fibers such as asbestos, glass wool, pulp, etc., and by making the mixed material into a papery product by an ordinary dry or wet paper making method.

The carbon fiber for use in the present invention includes both carbonaceous and graphitic fibers. Generally, fibers of 5 to 20 microns in diameter and 3 to 10 mm or so in average fiber length are used. When the fiber length exceeds 10 mm, it becomes difficult from the technical standpoint to manufacture the electro-conductive sheet containing uniformly dispersed carbon fiber therethroughout with the result that irregularity in the resistance value from place to place in the sheet becomes prohibitive. On the other hand, if the average fiber length does not reach 3 mm, variation in the resistance value due to variation in the fiber length becomes enormous as shown in FIG. 3, so that it is difficult to manufacture with good reproducibility the resistance element (electro-conductive sheet) having stabilized performance.

Incidentally, the graphical representation in FIG. 3 indicates results of the measurement of electric resistance per square centimeter of electro-conductive sheets prepared by mixing carbon fibers 8 microns in diameter and cut into various fiber lengths in the range of 2 to 3 mm average with kraft pulp of coniferous trees at a mixing ratio of 1 : 1 (by weight) so that the weight of the produced sheet is 100 g/cm². From this graph, it is recognized that the resistance value is substantially constant with the fiber length of 3 mm and above, but it abruptly changes (increases) for a fiber length of less than 3 mm.

The mixing ratio of the carbon fiber should be in the range of from 35 to 75 percent by weight with respect to the total quantity of the fibers. The reason for this specified range is that, as shown in FIG. 4, when the carbon fiber content in the resistance element is less than 35 percent by weight, the electrical resistance abruptly increases. Although this may give an impression that the resistance value can be readily adjusted by the carbon fiber content, the value varies widely in accordance with a very slight change in the mixing conditions, and hence it is difficult to obtain the product with stabilized performance. On the contrary, the carbon fiber content of more than 35 percent by weight gives a constant value of resistance irrespective of the carbon fiber content as well as the fiber length, and the performance of the element becomes stable. When the carbon fiber content exceeds 75 percent by weight, the bonding strength of the carbon fiber with the other fiber due to entanglement, and the mechanical strength of the electro-conductive sheet is lowered causing the product to be practically useless.

Incidentally, FIG. 4 shows the measured values of electric resistance of electro-conductive sheet obtained by mixing carbon fiber of a diameter of 12 microns and lengths of 3 mm and 5 mm respectively with kraft pulp of coniferous trees at varying ratios. In this graph, the solid curves indicate a fiber length of 5 mm, and the dotted curves indicate one of 3 mm. From this graphical representation, it will be recognized that the electric resistance can be adjusted by changing the weight of the sheet. According to the present invention, the resistance value can be adjusted over a wide range of from 5 to 130 ohms. In addition, as the adjustment of the weight of the base sheet is easy in the paper making technique, the adjustment of the resistance value as well as the stability in performance is extremely easy in comparison with the known method of adjusting the resistance value by varying the carbon fiber content.

While the carbon fibers to be used may be produced from various raw materials, it is particularly recommended to use those obtained from pitch as the raw material, since their mechanical properties (particularly, strength and tenacity) are superior to those of the carbon fibers obtained from other raw materials and production methods than pitch.

For the metal wire net to be used as an electrode, there are usually used copper and aluminum. The metal wire net is cut into a band of some width and fitted at both ends of the electro-conductive sheet. The fitting may be made on either one surface or both thereof. When it is fitted on both surfaces of the sheet, the wire net is folded in two so that the folded net will embrace the sheet.

When the metal wire net is placed directly on the electro-conductive sheet, generation of heat takes place locally due to the contact resistance. In order therefore to lower the contact resistance, it is recommended to apply in advance electro-conductive paint onto the portion where the metal wire net electrode is to be attached. Any kind of electro-conductive paint available in the general market may be used.

The synthetic resin film to be used as the outermost layer of the panel heater according to the present invention consists of a lamination of a resin which is easily meltable and another resin which is difficult to melt.

Examples of the easily meltable resin are polyethylenes, polypropylenes, polyvinyl chlorides, and so forth. Examples of the resin which is difficult to melt are polyethylene terephthalates, polyamides, fluorine resins, etc..

Since the laminated synthetic resin film is used for electrical insulation as well as protection of the heater elements, it must have excellent insulative properties, moisture-resistant properties and others. Various methods for coating this insulating film on the electro-conductive sheet have been used such as, for example, "lamination method" (including "heat-rolling method," "adhesion method," etc.), "melt coating method," "solution coating method," and so forth.

The heretofore known electro-conductive sheet containing a large quantity of cellulosic fiber, but less carbon fiber is inferior as to its ability to be impregnated by the protective resin coating. Further, the resistance value varies to a considerable degree due to the impregnation with such a protective resin coating.

The electro-conductive base sheet according to the present invention, on the contrary, is easily impregnated with the resin, which therefore penetrates sufficiently into the base sheet and fixes the contact points among the carbon fibers. No resistance value changes occur due to this resin impregnation. Consequently, by impregnation of thermosetting resins such as phenol resin, diaryl phthalate resin, expoxy resin, and furfural resin into the base sheet beforehand, improvement in performance of the base sheet as the heat generating element can be secured. That is, the effects to be attained with this impregnation of the protective resin coating are: (1) improvement in stability of the resistance value in the case of long term electric conduction and heating; (2) improvement in mechanical strength; (3) improvement in stability of resistance to various external forces such as tension, compression, bending, winding, etc.; and (4) improvement in stability of resistance value with variation in external moisture due to lowering of the moisture-resistant property, and so on. In this case, if the quantity of the impregnated resin exceeds 70 percent by weight, a layer of resin is formed on the surface of the base sheet, which not only spoils the outer appearance of the sheet, but also increases the contact resistance at the time of the electrode fitting, so that the sheet becomes unsuitable for manufacturing the panel heater.

Figure 5:
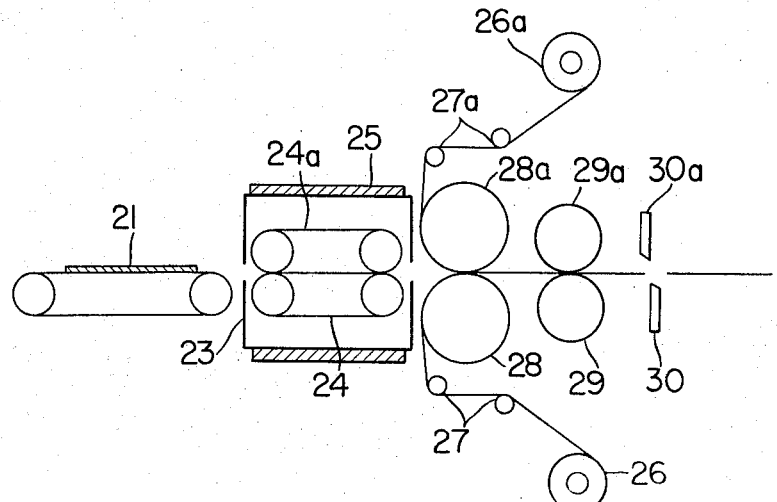
FIG. 5 is a schematic view showing the manufacturing process of the panel heater according to the present invention.
Figure 7:
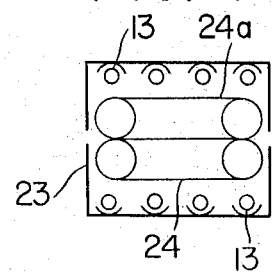
FIG. 7 is an example of using infra-red heaters as the heating device 3 in FIG. 5.

In the following, a method for production of the panel heater according to the present invention will be described with reference to the apparatus shown in FIGS. 5 and 7.

A raw material paper 1 of mixed fibers is introduced into a heating device 23 by transferring the material on an arranging device 22 which includes a belt conveyor. The heating device 23 is provided in its interior with heat-resistant conveyors 24 and 24a. To obtain uniform heating, removal of volatile matter existing in the raw material, etc., the conveyor should preferably be constructed with chain or net. A plurality of rolls may also be used if necessary. The heating device 23 is further provided on its outer wall with heaters 25 capable of uniformly raising the temperature within the chamber to a required level for quickly removing the volatile matters in the raw material paper. The heater may be of any type such as ordinary planar heater, hot air circulator, etc.. Instead of using the external heaters as mentioned above, a plurality of infra-red ray heaters 13 as shown in FIG. 7 may also be used.

The raw material paper 1 should have the volatile matters substantially completely removed in the course of its passing through the heating device 23. If the volatile matters remain in the raw material paper, they will eventually become a cause of trouble in the panel heater by bringing about considerable change in electric resistance with lapse of time due to such volatile matters, particularly water, being evaporated by the temperature increase caused by passage of electricity therethrough, but being prevented from volatizing owing to the protective film layer covering the heat generating element.

Any remaining volatile matters are vaporized and will expand owing to heat generated by of the resistance element, and cause segregation of the entangled fibers within the electro-conductive base sheet 1 or peeling of the protective insulation film 3 from the sheet, onto which it was adhered by heat and pressure, whereby it closes to function as a heat generating element. Further, the papery produce made from pulp tends to be deformed at the time of heat generation to cause local shrinkage in the element.

For the abovementioned reason, therefore, if the heat treatment process of the raw material 1 in the heating device 23 is omitted, there inevitably takes place deformation of the raw material paper during the subsequent rolling operation by heated pressure rolls 28 and 28a where it is heated with the consequence that a heat generating element having a predetermined shape and size is difficult to obtain. As a consequence, it becomes important that the heat-treatment of the raw material 1 in the heating device 23 be conducted while pressing material 1 from above and below between the two belt conveyors 24 and 24a so as to prevent any deformation of the raw material paper 1 from occurring.

The raw material paper 1 thus heat treated is immediately transferred to the heated pressing rolls 28 and 28a in its heated state. In this rolling operation, continuous webs of thermoplastic resin film 26 and 26a are simultaneously introduced into the rolls 28 and 28a by way of tension rolls 27 and 27a while the raw material paper is being held between these webs of film 26 and 26a. The raw material paper 1 and the resin films 26 and 26a in this state are rolled by the heated rolls 28 and 28a where the molten resin film impregnates the raw material due to the pressure adhesion to increase its bonding strength with the base sheet. The electro-conductive raw material sheet is thus perfectly sealed between the thermoplastic resin films which are sufficiently adhered to the base sheet.

The pressure rolls 28 and 28a are preferably a combination of a metal roll and a heat-resistant rubber roll. However, any other combination such as, for example, rubber and rubber, or metal and metal, etc. may be employed provided that heat-resistance of the rolls is taken into account. The pressure rolls 28 and 28a are heated in such a manner that the temperature thereof may be maintained uniformly in both the peripheral and breadthwise directions of the rolls. The adhesiveness of the thermoplastic resin films 26 and 26a will be further improved by being preheated along the pressure rolls 28 and 28a or by infrared ray heaters.

In the generally practiced method of putting a thermoplastic resin film and paper together, a solvent-type adhesive agent is applied onto the surface of the thermoplastic resin film of the preliminary stage of adhesion, and, upon drying of the adhesive agent, both are put together between pressure rolls maintained at a relatively low temperature. This method, however, has a fatal defect that perfect removal of volatile solvent contained in the adhesive agent is hardly possible. In using such a sheet for a heat generating element as in the present invention, residual volatile matter within the element brings about serious trouble, so that the present invention avoids use of such a solvent-type adhesive agent and impregnates the raw material paper with molten thermoplastic resin film by pressure-rolling under heat to secure sufficient bonding between them.

Figure 6:
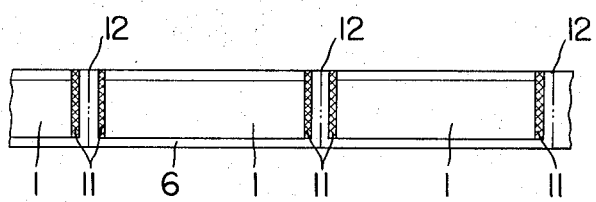
FIG. 6 is a schematic plan view showing continuously produced panel heaters which are completely insulated with an insulative coating film.

The raw material sheet 1 covered with the insulative coating films 26 and 26a by means of the heated pressure rolls 28 and 28a as produced in the continuous form as shown in FIG. 6 is still in the state in which the resin film is molten at the bonded surface. If, therefore, the sheet is cooled naturally by leaving it in air, a wavy deformation occurs in the outer surface with the consequent impairment of the finished texture. Moreover, after the sheet leaves the heated pressure rolls 28 and 28a the pressure imparted thereto is removed which causes an increase in the electric resistance due to expansion of the sheet as well as the bonded portion where the molten resin film is impregnated, and a large fluctuation in the resistance, all of which are serious problems from the standpoint of quality control of the product. Also, if the sheet is subjected to natural cooling while applying tension thereto it will have an improved outer appearance. However, this method not only lowers productivity of the product to a remarkable degree, but also causes no improvement in the electric resistance thereof.

In order to avoid such a detrimental effect to the final product, the present invention provides immediately after the heated pressure rolls 28 and 28a, a second set of pressure rolls 29 and 29a which are kept at a temperature lower than the melting temperature of the thermoplastic resin to be used, through which the layer of the molten resin is cooled to solidify if, while it is being pressed by the rolls 29 and 29a, whereby the outer appearance of the finished product is kept good and the electric resistance thereof is stabilized.

In order to enable skilled persons in the art to readily practice the present invention, the following preferred embodiments are presented. It should however be noted that the present invention is not limited to these examples alone, but any changes and modifications may be made within the extent of the disclosure as well as the cope of protection as recited in the appended claim.

EXAMPLE 1

An electro-conductive web (having a weight per square meter of approximately 100 g) was manufactured by mixing 40 parts by weight of carbon fiber having a diameter of 8 microns and an average fiber length of 3 mm and 60 parts by weight of wood pulp through an ordinary paper-making machine. From the web thus obtained, a test piece having a length of 101 cm and a width of 10 cm was cut out.

At both ends in the lengthwise direction of the test piece, electro-conductive paint (manufactured by Fujikura Densen K.K., Japan) was applied on both surfaces of the web for a distance of 5 mm from the end thereof. On this paint coating, plainly woven copper-wire net of 80 meshes having a width of 5 mm was placed to cover the entire coated surface in sandwich form. Then, on both surfaces of the entire web test piece, there was placed a synthetic resin film produced by laminating polyethylene terephthalate film 50 microns thick and polyethylene film 100 microns thick with the polyethylene layer being against the web to constitute an inner layer in a manner as shown in FIG. 1, and the laminated films were press-heated by a press-heating apparatus at a temperature of 130° C for 3 minutes under a pressure of 40 kg/cm².

The panel heater thus produced was found to have a resistance of 110 ohms, to maintain a surface temperature of 81° C while passing alternating current of 100 volts at room temperature, and to exhibit no wear and tear or abnormality in temperature at the electrode portion or heat generating portion even after continuous use for 2,000 hours. Also, the panel heater was found to be able to withstand a voltage of higher than 1,500 volts of alternating current.

EXAMPLE 2

Carbon fiber 8 microns in diameter produced by subjecting raw material pitch obtained from flame cracking of naphtha up to and including 1,000° C was cut into fibers of an average length of 5 mm.

40 parts by weight of this carbon fibers was mixed with 60 parts by weight of kraft pulp of coniferous trees pounded to an average fiber length of 2 to 3 mm, made into a sheet by a papermaking machine, and dried to a final product approximately 0.3 mm thick. From this sheet, a test piece of a size of 100 cm in length and 10 cm in width (resistance of 100 ohms) was cut out.

At both ends in the lengthwise direction of the test piece a band-shaped copper wire net having width of 5 mm and mesh size of 80 was fixed as an electrode. Then, both surfaces of the entire test piece were covered with a laminated film of polyester of 50 microns thick and polyethylene of 100 microns thick with the polyethylene layer being on the inside, and the whole test piece was press-heated by a press-heater for 3 minutes at a temperature of 130° C under a pressure of 40 kg/cm² to melt the polyethylene layer and adhere it to the test piece.

The panel heater thus obtained was found to have an electric resistance of 101 ohms and an ability to withstand a voltage of higher than 1,500 volts, to maintain uniform surface temperature of 80° C throughout the surface thereof while passing an alternating current of 100 volts at room temperature, and to exhibit no change in its resistance and temperature even after continuous conduction of electricity for 1,000 hours, thereby showing excellent stability.

This panel heater did not exhibit any change in resistance under a compression of 150 kg/cm², for example. Even when it was subjected to a bending test by being bent 1,000 times at an angle of 180° C with a radius of curvature of 1 mm, the resistance change was as small as 1 percent or so. A similar result was noted with a panel heater containing 35 to 37 percent of carbon fiber.

In contrast thereto, a panel heater containing 25 percent of the carbon fiber exhibited a resistance change of 5.3 percent when under a compression of 150 kg/cm² as well as 6.8 percent change after bending 1,000 times. This tendency to increasing resistance change was clearly recognized in panel heaters of lower carbon fiber content.

EXAMPLE 3

40 parts by weight of carbon fiber having a diameter of 10 microns, a length of 3 mm, and a baking temperature of 2,000° C, and 60 parts by weight of pounded kraft pulp were dispersed in an aqueous suspension, and uniformly mixed together, after which the mixed fibers were made into paper by a paper-making machine. The weight of the paper thus obtained was 31 g/m², and its electric resistance value across the opposing sides of the square (resistivity per square) was 10 ohms.

The paper was then caused to pass through a methanol solution of phenol resin "SP-301" (a product of Gunei Chemical Co., Japan) so as to impregnate it with the resin. The concentration of methanol solution was 5–40 percent by weight and the quantity of the resin adhered to the paper was 6–80 percent by weight with respect to the weight of the resin impregnated paper. The resin impregnated paper was then heated for 5 minutes in a hot air dryer of 100° C, thereby volatilizing the methanol therein, and thereafter it was further heated for 10 minutes at 180° C to harden the impregnated resin.

The thus processed resin impregnated paper was cut into test pieces of a size 8 cm wide and 85 cm long. At both ends of the test piece in its lengthwise direction, silver paint was applied, onto which a band shaped copper wire net of 80 meshes having width of 5 mm was press fitted. The test piece was sandwiched between a laminated film composed of a polyester layer 50 microns thick and a polyethylene layer 100 microns thick with the polyethylene layer being on the inner side, which was then pressed by a heated roll of 130° C for 3 minutes under a pressure of 40 kg/cm² so as to melt the polyethylene resin layer.

The thus produced panel heater was found to have an electric resistance of 102 ohms (±2 ohms), to maintain a uniform surface temperature of 80° C throughout the entire surface thereof when alternating current of 100 volts was conducted therethrough at room temperature, and to exhibit no variation in the electric resistance or to have any other abnormality even after continuous electric conduction for 7,000 hours, and hence it showed excellent stability in performance. It was further found out that the panel heater exhibited only −1 percent of the resistance variation, when it was subjected to bending 10,000 times at an angle of 180° with a radius of curvature of 5 mm, and no fluctuation in the resistance under a compression of 150 kg/cm².

EXAMPLE 4

For the heat generating body, a sheet made of a mixture of 40 parts by weight of carbon fibers and 60 parts by weight of pulp was used.

Test pieces of a size 100 cm in length and 10 cm in width were cut out of the abovementioned sheet. A copper/steel electrode of 118 ohms resistance was attached to both ends in the lengthwise direction of the test piece, and the test piece was heat-treated for 2 minutes in a heating apparatus at a temperature of from 130 to 150° C to make the electric resistance value thereof 100 ohms. Thereafter, a laminated synthetic film of polyester 50 microns thick and high pressure polyethylene 100 microns thick was placed on both surfaces of the entire test piece with the high pressure polyethylene layer on the inner side directly facing and in contact with the heat generating body, and the laminated film was rolled under a pressure of 30 kg/cm² by a pressure-roller heated to 150° C so as to melt the film to adhere onto the heat generating body and was naturally cooled, while imparting tension thereto.

Besides the above, a heat generating body manufactured in the same manner as above up to the step of causing the laminated synthetic film to melt and adhere to the heat generating body was cooled under a pressure of 20 kg/cm² at a temperature of 40° C by means of the cooling roll of the present invention so as to fix the film onto the heat generating body.

The following Table indicates the comparative experimental values of electric resistance of the abovementioned two kinds of heaters which were cooled in different ways.

| Sample No. | Natural Cooling under Tension ohms | Cooling by Pressure Roll ohms |
|---|---|---|
| 1 | 125 | 101 |
| 2 | 139 | 103 |
| 3 | 123 | 100 |
| 4 | 126 | 102 |
| 5 | 129 | 100 |
| 6 | 135 | 100 |
| 7 | 121 | 104 |
| 8 | 138 | 103 |
| 9 | 125 | 103 |
| 10 | 120 | 100 |
| Average | 128.1 | 101.6 |
| Difference between the maximum and minimum values | 19 | 4 |
| Fluctuation | 14.8 % | 3.9 % |

As will become clear from the above comparative data, it was possible to obtain the panel heater having a similar electric resistance value of the sheet after removing volatile matters therefrom and to reduce fluctuation in the electric resistance to a remarkable extent, which is important in the quality control of the product.

As has been described in the foregoing, the present invention does not require any complicated preliminary operation in fitting the metal wire net to the electro-conductive sheet such as by sewing, mechanical fitting, or using an electro-conductive adhesive agent, but a single pressing operation under pressure can easily and safely accomplish bonding of the entire sheet and insulative coating film including the metal wire net electrode. Therefore, it is considered to be an excellent method for producing the panel heater.

Moreover, the panel heater according to the present invention is thin and pliable in comparison with the known panel heater, which not only facilitates handling of the product, but also does not cause variation in the resistance value due to external forces such as tension, bending, compression, etc., and generates heat with a uniform temperature distribution over the entire surface thereof. Also, it does not bring about any fluctuation in the resistance value or abnormal temperature variation owing to thermal expansion of the resistance element at the time of heat generation while in use, so that it is very stable during performance.

The present invention has been arrived at as a result of utilizing the phenomenon that the resistance value of the electro-conductive sheet of the mixed fibers depends on the contact resistance among the carbon fibers contained in the sheet. This characteristic of panel heater according to the present invention finds its use in various fields such as in household, industries in general, horticulture, snow-melting in snowy countries, transportation machinery, and other purposes, where warming or maintaining warmness of various objects are necessary.

We claim:

1. A method for producing a panel heater which comprises the steps of:
   a. preparing an electro-conductive base sheet by mixing carbon fiber having an average length of from 3 to 10 mm with natural or synthetic fiber, and forming the resulting mixture into a sheet;
   b. subjecting the thus prepared electro-conductive base sheet to a heat-treatment to remove volatile matter contained therein, to prevent said base sheet from deformation due to heat in the subsequent stage, and to improve adhesivity of a protective coating;
   c. fitting electrodes on at least one surface of the heat treated base sheet at both ends thereof;
   d. placing a film of thermoplastic resin which is electrically insulating against opposite faces of said base sheet and rolling the base sheet under heat and pressure, said heat being sufficient to melt said insulating thermoplastic resin film to adhere the film to said base sheet, thereby perfectly covering both faces of said base sheet with said insulative thermoplastic resin film to form a resin coated base sheet; and e. cold rolling the thus formed resin coated base sheet under pressure to cool and solidify the molten resin bonded to the surface of the base sheet, to stabilize the electric resistance of the base sheet, and to improve the appearance of the outside of the resin coated base sheet.

2. The method according to claim 1 further comprising applying an electro-conductive paint to a portion of the base sheet where an electrode is to be fitted prior to placing the thermoplastic resin film against the faces of said base sheet.

3. The method according to claim 1, further including the step of impregnating said base sheet with a thermosetting resin selected from the group consisting of phenol resin, diaryl phthalate resin, epoxy resin, and furfural resin immediately after the step (a) and prior to the step (b).

* * * * *